Nov. 7, 1950          H. B. LAW          2,529,086
METHOD OF MAKING FINE MESH SCREENS
Filed April 30, 1946
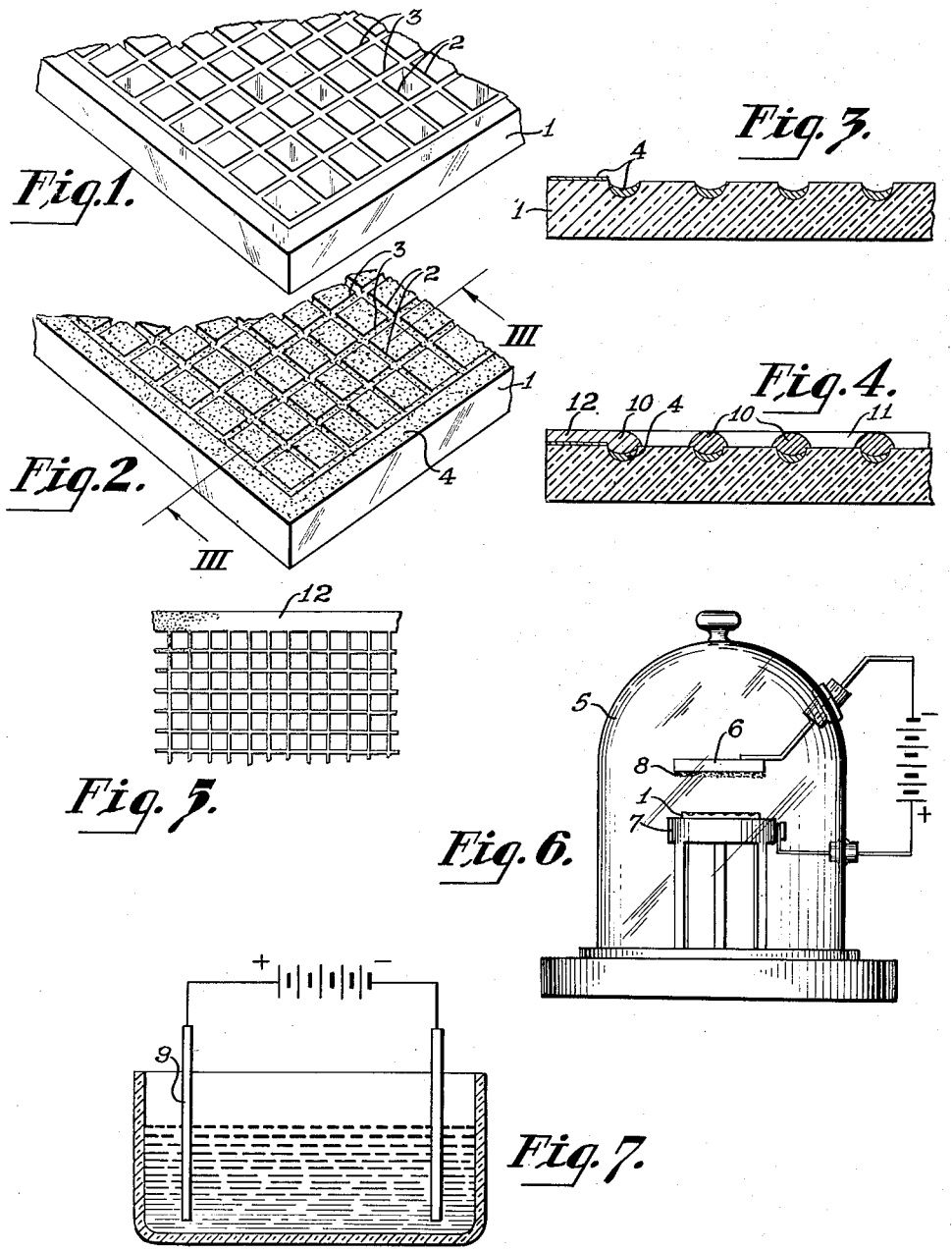
INVENTOR.
Harold B. Law
BY
ATTORNEY Patented Nov. 7, 1950

2,529,086

UNITED STATES PATENT OFFICE 2,529,086

METHOD OF MAKING FINE MESH SCREENS

Harold B. Law, Princeton, N. J., assignor to Radio Corporation of America, a corporation of Delaware Application April 30, 1946, Serial No. 666,037

8 Claims. (Cl. 204—11)

This application is a continuation-in-part of application Serial No. 531,008, filed April 14, 1944, now abandoned.

The present invention relates to an improved method of making screens, and more particularly to methods of making screens of extremely fine mesh, large open area, and a high degree of uniformity such, for example, as needed for use in the image orthicon pick-up tube or other apparatus requiring fine mesh grids.

Screens of fine mesh approaching the order of fineness but not the quality of those made according to the present invention have heretofore been made of woven wire or formed by electroplating conductive parts of a pattern made with the aid of light sensitive emulsions. These prior screens have been found inadequate and only partially satisfactory for use in image orthicon tubes. Some of these screens have been of a mesh of four hundred to the inch but whether of the woven type or of the electrodeposited type, irregularities and blemishes render the results unsatisfactory. In addition, such screens have a very low light or electron transmission factor. A necessary compromise of these results has been accomplished by employing screens of only two hundred and thirty mesh to the inch as thereby a greater uniformity of weave is obtained. These screens may be etched to sixty per cent transmission. In a low mesh screen of this type the picture is materially limited by the superimposed screen pattern.

Some of the objects of the present invention are: to provide improved methods of making fine mesh screens; to provide a screen of large open area, of uniform structure, free of blemishes, and of very fine mesh; to provide a novel electrolytic method of making a fine mesh screen; and to provide other improvements as will hereinafter appear.

The invention will be better understood from the following description and the accompanying drawings of which, Fig. 1 represents a highly magnified view of part of a matrix having a gridwork of fine grooves corresponding in number, and width, to the metal mesh which is to be the final product.

Fig. 2 is the same matrix after having been given a light overall coating of sputtered metal partiallly filling in the grooves.

Fig. 3 is a further enlarged cross section detail view of the matrix of Fig. 2 taken along the line III—III after the sputtered metal on the raised portions of the mosaic has been removed.

Fig. 4 is the same cross section view shown in Fig. 3 having a thickness of metal electroplated over the sputtered metal layer in the grooves.

Fig. 5 is a highly magnified view of part of a completed screen.

Fig. 6 is a side elevation of a typical arrangement of apparatus used for depositing a metal by cathode sputtering.

Fig. 7 represents a sectional elevation of typical electroplating apparatus.

In order to secure optimum results using the method of the present invention, careful attention to detail is necessary. The first part of the method comprises preparing a matrix of glass or other hard ceramic material. This is done in a number of carefully controlled steps. The first step consists in ruling a gridwork of very fine grooves on the surface of the matrix. The grooves must be of uniform depth and width and must not have ragged edges; therefore, the manner in which these grooves are cut is of importance although not a part of the present invention. A conventional etching method has proven satisfactory. In this method, the glass surface is covered with a thin layer of a resist compound and by means of a diamond point, the required number of lines are scratched through the resist to expose the glass surface beneath. The surface thus prepared is etched for only a few seconds in hydrofluoric acid of suitable concentration or other etching solution to produce very shallow grooves in the glass surface. These grooves are preferably from 0.0002 to 0.0005 inch in depth and the same in width, depending on the screen mesh desired. The number of etched lines per inch corresponds to the desired mesh of the screen to be made and is preferably of the order of from 500 to 1500. Cutting the lines directly in the glass with a diamond point is not as satisfactory since the edges are ragged.

As in other conventional etching processes, the resist is removed from the raised portions of the mosaic between the gridwork of grooves and the plate is ready for the next step. The prepared matrix is illustrated in Fig. 1, the glass plate 1 having longitudinal grooves 2 and transverse grooves 3 ruled on its surface. In this next step, a very thin layer of metal 4 is sputtered over the side of the glass plate which now has the grooves inscribed in its surface. This sputtering process takes place in a conventional vacuum chamber 5 illustrated in Fig. 6. Within this chamber is placed a cathode 6 and an anode 7. A suitable source of either D.-C. or A.-C. potential provides the energy to form a glow discharge within the chamber. The grooved plate 1 is placed on the anode 7. The metal to be sputtered on the plate is preferably placed as a coating 8 on the bottom of the cathode 6. The cathode is preferably an aluminum disc. To obtain screens of uniformly high quality, the metal used in this sputtering step should be carefully chosen. For optimum results, it has been found highly desirable to use a suspension of metals in volatile oils known as "Liquid Bright Palladium," No. 62 and it contains in addition to the palladium and the suspending medium gold and small amounts of other metals. Although pure palladium, itself, may be used in either plate or suspension form the results obtained are not nearly as good.

After the suspension has been coated on the cathode, it is heated in an oven to about 400–450° C. in order to completely drive off the volatile suspending agent. When dried, the material comprises principally the metals bismuth, palladium, and gold in the ratio of approximately 1 part bismuth, 7 parts palladium, and 25 parts gold. When the drying has been done, the chamber is sealed and the sputtering process carried out. For good results, the sputtering conditions must be carefully controlled. The glass plate is placed 1 to 3 inches from the cathode and the pressure adjusted so that the plate lies just at the edge of the negative glow of the discharge. The vacuum used is of the order of a few tenths of a millimeter of mercury, from .1 to .4 mm. having proven efficient. Sputtering voltages of the order of 1,000 are preferred although lower voltages may be used. Sputtering time under these conditions is about 2 minutes although obviously lower or higher sputtering voltages will result in variations in the time of sputtering.

Another condition which must be carefully controlled during the sputtering process in order to get adherence is that of relative humidity of the atmosphere within the sputtering chamber. Surprisingly enough, a certain amount of moisture is needed in the atmosphere within the sputtering chamber to obtain a very thin layer of metal having the properties needed for this particular process. For optimum results, the relative humidity should be 40–50 percent, the results becoming less satisfactory above and below this range. Exact conditions must be determined for each matrix.

Thickness of the sputtered metal layer 4 is preferably very small. Advantageously, the thickness is measured in terms of light transmission with the aid of a photometer. The preferred thickness in the process of the invention is one allowing 80 per cent of white light, incident on the surface, to pass through. Other thicknesses may be used, a good range being 60–80 percent transmission, but final results are generally not as good if thicknesses appreciably greater than this are used. The condition of the plate after having received a coating of sputtered metal is illustrated in Fig. 2.

The next step in the process is to bring the glass plate out of the sputtering chamber and to remove the metal which was deposited on the raised areas of the mosaic between the grooved lines without damaging the metal coating within the grooves, themselves. This is done by applying water as a lubricant and carefully rubbing with a rubber glove finger until the metal on the raised areas is removed. The matrix is now in the condition shown in cross section in Fig. 3. The coating along one edge is allowed to remain for purposes of making contact with the plating electrode.

The thin conductive coating 4 in the grooves must be backed up with a thickness of metal relatively much greater in order to make a final product which is self-supporting. To strengthen the conductive coating in the grooves a metal such as copper is plated on the conductive coating. Since the conductors are recessed the plating first must fill the grooves before the wires begin to broaden. This enables more open screens to be made for a given amount of metal in the wires than if the plating were allowed to take place in a sidewise direction at the time the plating is started. Also the wires can be made very thin because the finished screen does not need to be pulled away from the conductor or stripped from the matrix because the screens may be made to "float" off as the matrix is washed. The degree to which the screens stick is controllable when the matrix is made and in practice are made to stick slightly to secure longer life from the matrix but not enough to damage or even "curl" the screen as it is removed.

In contrast, the conventional photoengraving process matrix has a smooth surface, that is the conductor and insulator part are the same height, and the plating is done directly on the conductor that has been coated with a parting medium. If the screen is not plated sufficiently thick the force needed to strip the screen will either break or badly curl the screen. Also since the matrix is flat the plated wires broaden from the time the plating first begins. The net result is that screens of large open areas and very fine mesh cannot be made by the conventional photoengraving process for making screens. The plating is done according to the invention by connecting up the plate as cathode in an electroplating bath as illustrated in Fig. 7. A plate preferably of pure copper 9 is made the anode and the electrolyte may be a conventional acid copper plating bath of which the following is a typical example.

Example A

Copper sulfate crystals_____ounces__ 32
Concentrated sulfuric acid_____do____ 6
Water to make_____gallon__ 1
Molasses_____approximately 0.01 part per gal. of solution by weight.

Plating is conducted at about room temperature and for screens 3 to 4 inches square a current of 1 ampere is preferred. The plating is continued until the grooves are substantially filled with copper and the copper extends a slight distance above the surface of the glass plate. This is shown in Fig. 4 where 10 is the thickness of metal deposited by electroplating in the longitudinal grooves. The transverse grooves 3 are, of course, similarly filled in with the metal extending slightly above as shown at 11. In the figure, the thickness of metal extending above the glass plate has been exaggerated for purposes of illustration. Plating is usually complete in 2 to 4 minutes and this time will, of course, vary with the current density utilized.

Metals other than copper may be electroplated over the thin coating of sputtered metal, copper merely being an example of a metal which is easy to plate and which is readily available. The only requirement seems to be that the metal be deposited from a bath which is either neutral or at least slightly acid. Good quality screens comprising other metals such as nickel and zinc have been made up. Conventional plating baths were used in each instance.

The conducting coating of sputtered metal is, of course, extremely thin and therefore has a relatively high electrical resistance. For this reason, copper does not at once deposit uniformly over the entire surface of the grid but first deposits in an arc around the point or points of contact with the lead from the source of plating current. But the arc of deposited copper quickly spreads and very soon covers the entire surface as the resistance drops.

With the deposition completed as shown in Fig. 4, the plate is washed carefully in water, whereupon the delicate screen can be easily peeled from the glass plate under water and lifted out by bringing it edgewise from the water. Fig. 5 represents the completed screen with its protecting edge 12.

If conditions throughout the sputtering step are not carefully controlled, faults will appear in the completed screen. The sputtered metal must be applied so that the degree of adherence to the matrix will allow the metal from the raised sections to be rubbed off without cracking or actually removing the metal from the grooves. If the applied coating is too thick, or if the relative humidity is too low, or if the sputtering metal is not of the right composition, it may not adhere to the glass properly. The ease with which the screen can be stripped from the matrix depends on the degree of roughness of the lines in the matrix. The control of sputtering is only to secure sputtered films that rub off without removing metal from the lines or do not rub off so hard the matrix may be damaged. Gaps in the screen are caused by metal having been removed from the grooves in those sections. Use of a pure palladium sheet as the source of the sputtering metal does not produce results of the quality needed for screens to be used in image orthicon tubes. Therefore, the use of the suspension described is a marked improvement and, in itself, produces results both unexpected and beneficial.

In practice the perfection of the screen is not limited by the sputtering process as small dust particles on the matrix do not impede the sputtering or leave holes in the sputtering. The limiting factor is the degree of excellence of the ruling and that art has been highly developed to give substantially perfect results. The rubbing process necessary to remove the metal does make it hard to keep from putting very fine scratches in the matrix that subsequently show up as extraneous wires. With care it is possible to make this a minor problem.

The process described results in the production of screens having excellent uniformity and an open area of the order of 60 per cent in the case of 500 mesh screens. With screens made by prior art methods, the open area for the same mesh is much less. Moreover, flaws are so prevalent that they cannot be used where perfect screens must be incorporated.

There has thus been presented a novel method of making fine mesh screens having a high percentage of open area and having excellent uniformity. The method itself is a distinct improvement over the former complicated methods involving the use of light sensitive compounds. What is more, the end product produced is of much higher quality.

I claim as my invention:

1. The method of forming a fine mesh screen which comprises forming grooves of a predetermined screen pattern in the surface of a hard ceramic plate, cathode sputtering a very thin layer of metal consisting essentially of about 1 part bismuth, 7 parts palladium, and 25 parts gold over said surface and in said grooves, removing the metal from the ungrooved portion of the surface, electroplating from a neutral or acid bath a substantial thickness of another metal over the sputtered metal in said grooves and stripping the formed screen from said plate.

2. The method of claim 1 in which said second deposited metal is copper.

3. The method of claim 1 in which said second deposited metal is nickel.

4. The method of claim 1 in which said sputtering operation is carried out in an atmosphere having a relative humidity of 40 to 50 percent.

5. The method of making a screen of about five hundred mesh to the inch and having a light transmission of at least sixty percent comprising forming shallow grooves corresponding to the desired screen pattern in the surface of a hard ceramic plate, applying over the surface of the plate including said grooves, by the process of cathode sputtering, a very thin coating of metal consisting essentially of about 1 part bismuth, 7 parts palladium, and 25 parts gold, the thickness of said layer corresponding to a light transmission value of 60-80 percent, removing the metal from the raised portion of the mosaic between said grooves, electroplating over the metal in said grooves a substantial thickness of another metal from a neutral or acid bath, and stripping the formed screen from said plate.

6. The method of claim 5 in which said electroplated metal is copper.

7. The method of making a screen of about 500 mesh to the inch comprising forming shallow grooves of a predetermined screen pattern in the surface of a hard ceramic plate, applying over the surface of said plate and in said grooves a very thin coating of metal consisting essentially of about 1 part bismuth, 7 parts palladium, and 25 parts gold, said metal being applied by the process of cathode sputtering within a partially evacuated chamber having a relative humidity of 40-50 percent, removing the metal from the raised portion of the mosaic between said grooves, electroplating from a neutral or acid bath an appreciable thickness of another metal over the metal in said grooves, and stripping the formed screen from said plate.

8. The method of claim 7 in which said electroplated metal is copper.

HAROLD B. LAW.

REFERENCES CITED

The following references are of record in the file of this patent:

UNITED STATES PATENTS

| Number | Name | Date |
| --- | --- | --- |
| 313,805 | Callow | Mar. 10, 1885 |
| 678,383 | Eppler | July 16, 1901 |
| 1,563,731 | Ducas | Dec. 1, 1925 |
| 1,994,668 | Russell | Mar. 19, 1935 |
| 2,067,502 | Pollard et al. | Jan. 12, 1937 |
| 2,166,366 | Norris | July 18, 1939 |